United States Patent

Kubo et al.

[11] Patent Number: 5,908,370
[45] Date of Patent: Jun. 1, 1999

[54] HYDRAULIC CONTROL SYSTEM USING A TORQUE ALLOTMENT RATIO TO DETERMINE ENGAGEMENT PRESSURES FOR AN ENGAGING AND A DISENGAGING FRICTIONAL ELEMENT DURING A SHIFT IN AN AUTOMATIC TRANSMISSION

[75] Inventors: Takayuki Kubo; Masaaki Nishida; Yoshihisa Yamamoto; Akitomo Suzuki; Hiroshi Tsutsui; Kazumasa Tsukamoto, all of Anjo, Japan

[73] Assignee: Aisin AW Co., Ltd., Japan

[21] Appl. No.: 08/840,711

[22] Filed: Apr. 25, 1997

[30] Foreign Application Priority Data

Apr. 30, 1996 [JP] Japan ..................... 8-109786

[51] Int. Cl.$^6$ ....................................... F16H 5/40
[52] U.S. Cl. .................... 477/144; 477/143; 477/156
[58] Field of Search ................... 477/143, 144, 477/148, 149, 154, 155, 156

[56] References Cited

U.S. PATENT DOCUMENTS 5,368,531  11/1994  Ando et al. ................... 477/143 X
5,872,711  7/1998   Tsutsui et al. ................ 477/156

Primary Examiner—Charles A. Marmor
Assistant Examiner—Ankur Parekh
Attorney, Agent, or Firm—Lorusso & Loud

[57] ABSTRACT

In power-on, high-vehicle-speed and high-torque conditions, a control unit sets a torque allotment ratio such that a main clutch bears all the torque. Thereby, the input shaft rotational speed is increased by controlling solely the main clutch releasing pressure. In power-on and low-torque or low-vehicle-speed conditions, the control unit sets a torque allotment ratio for the main clutch torque and the sub-clutch torque to 1:1. Thereby, control of the main clutch releasing pressure and control of the sub-clutch engaging pressure simultaneously proceed in parallel to produce a change in the input shaft rotational speed without a time lag. The hydraulic control apparatus thus conducts proper downshift control for a shift involving clutch engagement changeover, under all vehicle running conditions, without need for additional control logic.

23 Claims, 11 Drawing Sheets dP1MC : Main Clutch Sweep Gradient
Capsc : E*Tt  : Required Holding Pressure
         F*CapMC : Main Clutch Holding Torque
         I$_\Delta\omega$ : Inertia Torque
G : Area of Friction Member
μ : Friction Coefficient
H : Servo Stroke Pressure
Tsc : Torque Allotment Ratio dP1MC : Main Clutch Sweep Gradient
Capsc :
E*Tt : Required Holding Pressure
F*CapMC : Main Clutch Holding Torque
$I_{\Delta\omega}$ : Inertia Torque
G : Area of Friction Member
μ : Friction Coefficient
H : Servo Stroke Pressure
Tsc : Torque Allotment Ratio out* gear : Pre-Shift Input Speed
NapUp : Rotational Speed Fall Amount
PapUp : Releasing-Side Releasing Pressure
TapUp : Engaging-Side Waiting Time

| | Vehicle Speed | | | | | |
|---|---|---|---|---|---|---|
| Throttle Opening | 1 | 1 | 1 | 0.8 | 0.7 | 0.5 |
| | 1 | 0.9 | 0.5 | 0.4 | 0.2 | 0 |
| | 1 | 0.5 | 0.8 | 0.1 | 0 | 0 |
| | 1 | 0.1 | 0.1 | 0.1 | 0 | 0 |
| | 1 | 0 | 0 | 0 | 0 | 0 |
| | 1 | 0 | 0 | 0 | 0 | 0 |

Torque Allotment Ratio Tsc Map Vehicle Speed

HYDRAULIC CONTROL SYSTEM USING A TORQUE ALLOTMENT RATIO TO DETERMINE ENGAGEMENT PRESSURES FOR AN ENGAGING AND A DISENGAGING FRICTIONAL ELEMENT DURING A SHIFT IN AN AUTOMATIC TRANSMISSION

BACKGROUND OF THE INVENTION

1. Field of the Invention

The present invention relates to a hydraulic control system for an automatic transmission and, more particularly, to hydraulic control of a so-called clutch-to-clutch (engagement changeover) shift that changes speeds by engaging one frictional engagement element and releasing another frictional engagement element, especially, a clutch-to-clutch downshift.

2. Description of the Related Art

In normal running vehicle operation changes between a power-on condition where the accelerator pedal is depressed so that drive force is transmitted from the engine to the wheels, and a power-off condition where the accelerator pedal is released so that no drive force is transmitted from the engine to the wheels. Operation will also change between a high-vehicle-speed and high-torque running condition and a low-vehicle-speed and low-torque running condition. The automatic transmission of the vehicle is controlled to shift in accordance with these various running conditions. The shifts required of the automatic transmission include, for example, a power-on downshift, that is, a downshift in response to depression of the accelerator pedal as in kick-down, and a power-off upshift, that is, an upshift in response to release of the accelerator pedal.

Japanese examined patent application publication No. HEI-6-33817 discloses a hydraulic control method for the aforementioned clutch-to-clutch (engagement changeover) shift. This method determines that a frictional engagement element engaged in the shift has reached post-shift input-output rotational synchronism upon detection that its input-output rotational speed ratio has reached approximately 1.0. For a power-on downshift or a power-on upshift, the hydraulic control method maintains the operating pressure supply to the post-shift speed frictional engagement element at a pressure slightly lower than the engagement starting pressure, during a period from the start of the shift until input-output rotational synchronism is determined. Upon detecting the input-output rotational synchronism, the operating pressure is raised to a predetermined engaging pressure, thereby precisely engaging the post-shift clutch without a time lag.

The above-described conventional hydraulic control method effects a power-on downshift by releasing the pre-shift frictional engagement element to allow the engine speed to rise, and maintaining the engaging pressure at a low level until the input and output rotational speeds of the post-shift frictional engagement element become synchronous, and engaging the post-shift frictional engagement element after the input-output synchronization. However, although this control is effective at high vehicle speeds, because the engine speed rises rapidly (the rotational speed change is large), the control may fail to timely complete engagement of the post-shift frictional engagement element at low vehicle speed or low torque because the rotational speed change is small, giving an unpleasant sensation to the driver.

Theoretically, it is also possible to simultaneously control the engaging fluid pressure and the releasing fluid pressure independently of each other, while the vehicle is at a low speed. However, this method would also require separate control logics and, as a consequence, an increased memory capacity. Moreover, the aforementioned conventional hydraulic control requires a separate control logic for a power-off downshift instructed by, for example, a manual downshift operation, and therefore also requires additional memory capacity.

SUMMARY OF THE INVENTION

Accordingly, it is an object of the present invention to provide a hydraulic control system for an automatic transmission capable of appropriately controlling a clutch-to-clutch (engagement changeover) downshift under all driving conditions, without requiring an additional control logic.

Accordingly, the present invention provides a hydraulic control system for an automatic transmission including: an input shaft that receives drive force from an engine output shaft; an output shaft connected to a drive wheel or wheels; a plurality of frictional engagement elements for changing the torque transmission path between the input shaft and the output shaft; and hydraulic servos for selectively engaging and disengaging the frictional engagement elements. The hydraulic control system of the invention achieves a downshift to a target speed by releasing a first frictional engagement element and engaging a second frictional engagement element. Hydraulic control means controls the fluid pressures on the hydraulic servos, inclusive of those for operating the first and second frictional engagement elements. A control unit is provided for receiving signals from sensors which detect various vehicle running conditions and for outputting hydraulic control signals to the hydraulic control means. The control unit includes: torque allotment ratio setting means for setting an allotment ratio between the torque to be borne by the first frictional engagement element and the torque to be borne by the second frictional engagement element, on the basis of signals from the sensors; and allotment fluid pressure control means for, based on the torque allotment ratio, outputting hydraulic control signals to the hydraulic control means, the signals being determined so that the first frictional engagement element and the second frictional engagement element have torque capacities capable of bearing their respective allotments of input torque.

Because the hydraulic control system of the invention controls the fluid pressure on the first and second frictional engagement elements on the basis of the torque allotment ratio, the invention is able to control downshifts by favorable engagement changeover regardless of the vehicle running conditions. Furthermore, since the control can be adjusted to various vehicle running conditions simply by changing the torque allotment ratio, the invention can use one and the same control logic for all the vehicle running conditions, requiring only a small memory capacity.

In a preferred embodiment of the invention, if the vehicle running conditions are power-on, high vehicle speed and high torque, the torque allotment ratio setting means sets a torque allotment ratio such that the input torque is borne solely by the first frictional engagement element.

Under power-on, high-vehicle-speed and high-torque conditions, since the hydraulic control system of this preferred construction carries out shifts by the release control of the first frictional engagement element alone, the invention ensures that the engaging second frictional engagement element is in a state of slippage for only a short time, minimizing the amount of heat generated. Thus, the service life of the frictional engagement elements will increase.

It is also preferred that if the vehicle running conditions are power-on and low vehicle speed or low torque, the torque allotment ratio setting means sets a torque allotment ratio such that the first frictional engagement element and the second frictional engagement element are provided with respectively predetermined torque capacities. Under power-on and low-vehicle-speed or low-torque conditions, since the hydraulic control apparatus of this latter preferred embodiment controls release of the first frictional engagement element and engagement of the second frictional engagement element simultaneously and in parallel, the invention causes a change in the input shaft rotational speed without a time lag, thus providing a smooth shift.

In another preferred embodiment, with power-on, and within a range between a high vehicle speed and a low vehicle speed or within a range between a high torque and a low torque, the torque allotment ratio setting means sets a torque allotment ratio determined to maximize smoothness of the shift and to minimize amount of heat generated by the second frictional engagement element. Thus, this embodiment provides proper shift control with well balanced amounts of heat generation and a good shift feel under vehicle running conditions between a low vehicle speed and a high vehicle speed or between a low torque and a high torque.

It is also preferred that the allotment fluid pressure control means calculates a releasing-side fluid pressure based on the torque capacity of the first frictional engagement element, .and calculates an engaging-side fluid pressure to the second frictional engagement element as a function of the releasing-side fluid pressure.

Since the apparatus of this invention produces a change in the input shaft rotational speed mainly by controlling the release of the first frictional engagement element, it is able to perform proper downshift control using one and the same control logic for all power-on vehicle running conditions.

Preferably, the control unit has deciding means for deciding to proceed to a control operation wherein the engaging-side fluid pressure on the second frictional engagement element is controlled independent of the releasing-side fluid pressure on the first frictional engagement element, i.e. is given "major status."

The releasing-side fluid pressure becomes substantially nil during a shift when the input torque is small, for example, under power-off conditions. With the prior art control systems, if the release control were to be given major status under such conditions, shift control will become impossible because of failure to increase the engaging-side fluid pressure, which is dependent on the releasing-side fluid pressure. However, the apparatus of the preferred construction described above is able to assign major status to the engaging-side fluid pressure in shift control by using the deciding means, so that the shift control can be performed without changing the control logic even under power-off conditions. The invention thus provides smooth shifts.

In another preferred embodiment, the deciding means makes the decision based upon detection of a predetermined decrease in the input shaft rotational speed prior to a shift. The apparatus of this preferred embodiment detects a power-off condition as a reduction in the input shaft rotational speed, based on recognition of the fact that an input shaft rotational speed reduction during a downshift means a power-off condition. The detection of power-off conditions in this manner enables smooth transition to the control wherein the engaging-side fluid pressure is provided with a major status. In addition, since the power-off conditions can be detected merely by an input shaft rotational speed sensor, the invention does not require any special power-off detecting sensor, and eliminates the need for extra calculations, correspondingly reducing the required memory capacity. This feature of the invention thus allows a cost reduction.

In yet another preferred embodiment the deciding means decides power-off based on detection of a releasing-side fluid pressure below a predetermined fluid pressure. For example, if the engine assumes a power-off state during a power-on shift, the shift may stop because, although the input shaft rotational speed increases at the start of the shift, power-off subsequently reduces the input torque. However, this preferred embodiment is able to smoothly proceed to control wherein the engaging-side fluid pressure is provided with a major status, by detecting that the releasing-side fluid pressure has fallen below the predetermined pressure. Thus, the invention is able to continue the shift even in cases as described above, thus improving the shift feel.

The operation of the invention will now be briefly described. For downshift control involving release of the first frictional engagement element and engagement of the second frictional engagement element, the allotment fluid pressure control means makes a calculation based on the torque allotment ratio set by the torque allotment setting means, so that the torque capacity is accordingly allotted to the first frictional engagement element, that is, the releasing element, and the second frictional engagement element, that is, the engaging element, and outputs corresponding hydraulic control signals to the hydraulic control means.

For example, under power-on, high-vehicle-speed and high-torque conditions, the input torque is borne solely by the first frictional engagement element, and the input shaft rotational speed is increased by controlling the releasing pressure on the first frictional engagement element. Under power-on, and low-torque or low-vehicle-speed conditions, the input torque is borne by both the first frictional engagement element and the second frictional engagement element, and the releasing pressure control of the first frictional engagement element and the engaging pressure control of the second frictional engagement element are simultaneously performed in parallel.

BRIEF DESCRIPTION OF THE DRAWINGS

The foregoing and further objects, features and advantages of the present invention will become apparent from the following description of a preferred embodiment with reference to the accompanying drawings, wherein.

DETAILED DESCRIPTION OF PREFERRED EMBODIMENT

An automatic transmission to which the control system of the present invention may be applied will have many frictional engagement elements, such as clutches and brakes, and an automatic speed shift mechanism that selects a torque path through a planetary gear set by suitably connecting and disconnecting the frictional engagement elements. The input shaft of the automatic speed shift mechanism is connected to the engine output shaft by a torque converter. The output shaft of the automatic speed shift mechanism is connected to drive wheels.

Figure 1:
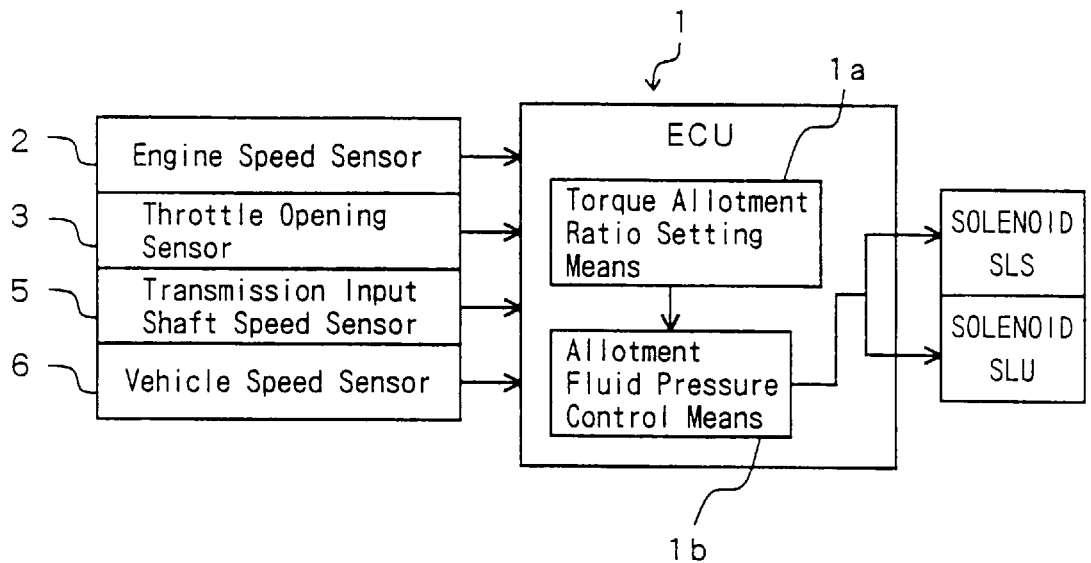
FIG. 1 is a block diagram showing an electronic portion of a control system of the present invention.

Referring to FIG. 1, illustrating the electronic control portion of the control system, a control unit 1, i.e. a microcomputer, receives signals from an engine speed sensor 2, a throttle opening sensor 3, a transmission (automatic transmission) input shaft speed (=turbine speed) sensor 5 and a vehicle speed (=automatic transmission output shaft speed) sensor 6, and outputs signals to linear solenoid valves SLS, SLU of the hydraulic circuit portion. The electronic control unit 1 comprises torque allotment ratio setting means 1a including a map for setting the torque allotment ratio between the torque to be borne by a main clutch to be released and the torque to be borne by a sub-clutch to be engaged, and allotment fluid pressure control means 1b for outputting signals to the linear solenoid valves SLS, SLU such that the main clutch and the sub-clutch will have torque capacities for bearing their allotments of the input torque.

Figure 2:
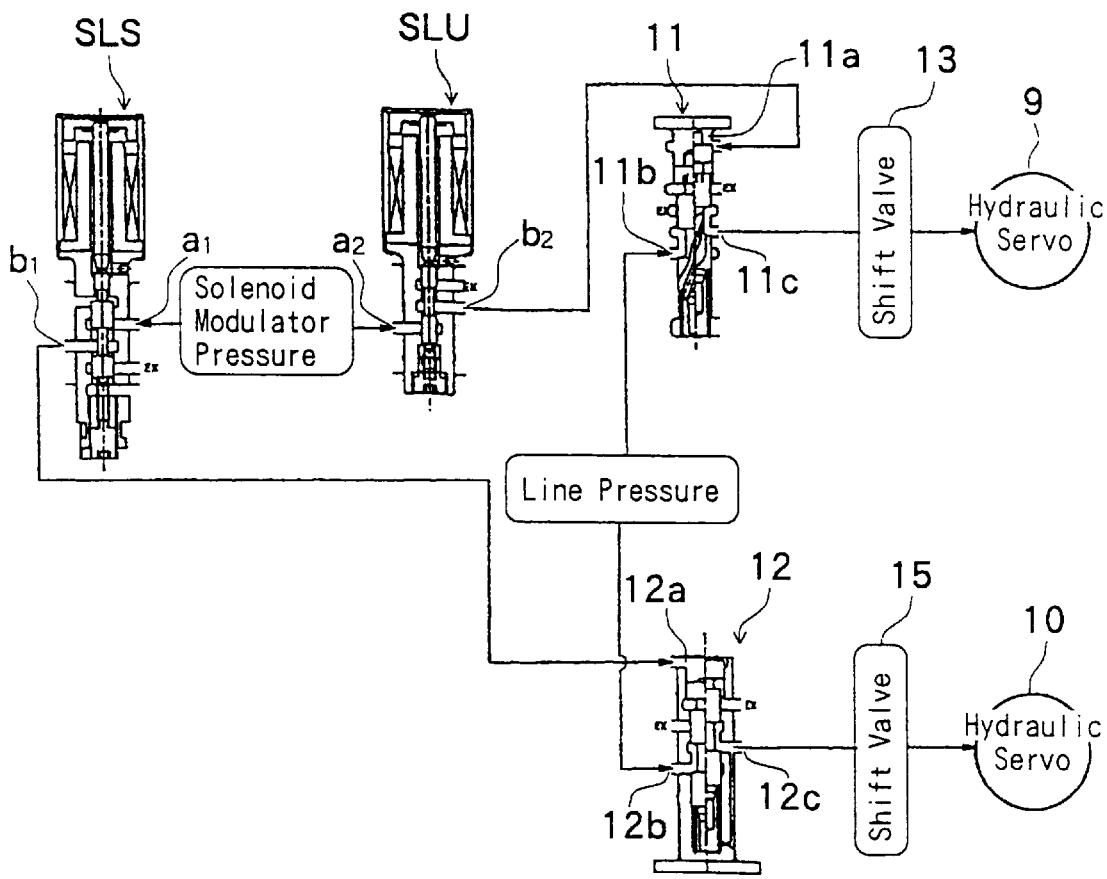
FIG. 2 schematically illustrates a hydraulic portion of a control circuit according to the present invention.

FIG. 2 schematically illustrates the hydraulic circuit portion which includes the two linear solenoid valves SLS, SLU and a plurality of hydraulic servos 9, 10 that engage and disengage a plurality of frictional engagement elements (clutches and/or brakes) for changing the torque path through the planetary gear unit of the automatic speed shift mechanism to achieve, for example, five forward speeds and one reverse speed. Input ports a1, a2 of the linear solenoid valves SLS, SLU are supplied with solenoid modulator pressure. The control fluid pressure from output ports b1, b2 of the linear solenoid valves is supplied to control fluid chambers 11a, 12a of pressure control valves 11, 12, respectively. Input ports 11b, 12b of the pressure control valves 11, 12 are supplied with line pressure. The pressure regulated by the control fluid pressures is suitably supplied from output ports 11c, 12c of the pressure control valves 11, 12 to the hydraulic servos 9, 10 via shift valves 13, 15, respectively.

The hydraulic circuit diagram shown in FIG. 2 shows only the hydraulic servos 9, 10 and the shift valves 13, 15 as representative of the many hydraulic servos and many shift valves incorporated into the automatic speed shift mechanism for changing over fluid pressure supplies to the hydraulic servos.

The downshift control involving engagement changeover of frictional engagement elements (clutch-to-clutch shift control) will be described in conjunction with the 3-2 speed shift. The 3-2 speed shift is achieved by the automatic speed shift mechanism (not shown) releasing a fourth brake (B4) and engaging a fifth brake (B5). Since this downshift is normally achieved by controlling the releasing-side fluid pressure as a major or primary control parameter and controlling the engaging-side fluid pressure in dependence upon the releasing-side fluid pressure, the releasing fourth brake is referred to as the main clutch MC and the engaging fifth brake as the sub-clutch SC.

Figure 3:
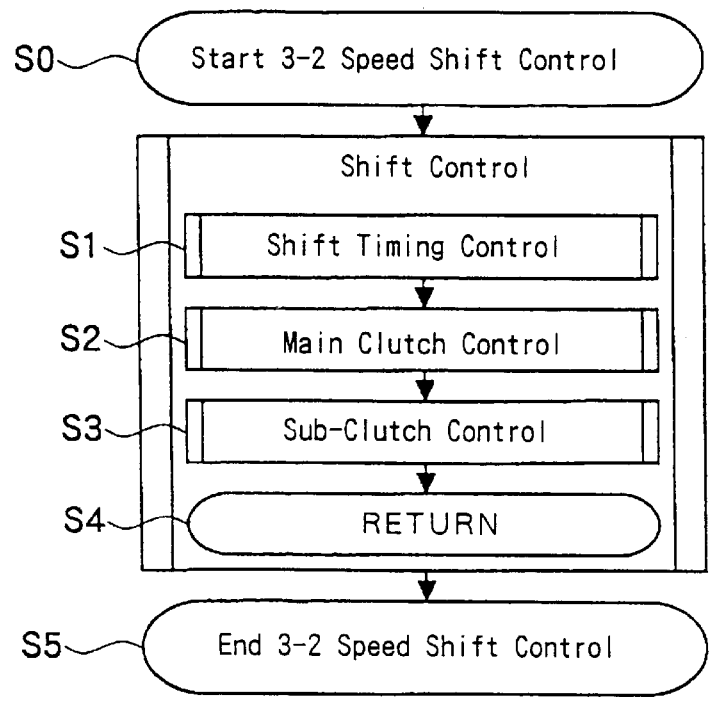
FIG. 3 is a flowchart illustrating the main routine for the 3-2 speed shift control.

Referring to FIG. 3, when the 3-2 speed shift is started (S0), the electronic control unit 1 performs shift timing control (S1), main clutch control (S2) and then sub-clutch control (S3), and repeats these steps (S4) for shift control. The 3-2 shift control then ends (S5).

Figure 4:
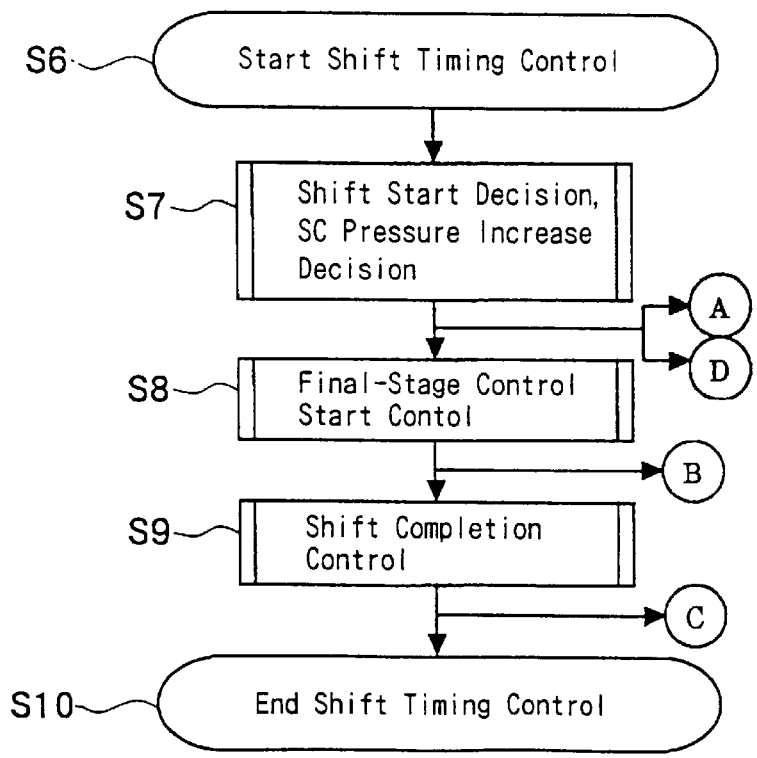
FIG. 4 is a flowchart illustrating the shift timing subroutine for the 3-2 speed shift (step S1 in FIG. 3)
Figure 5:
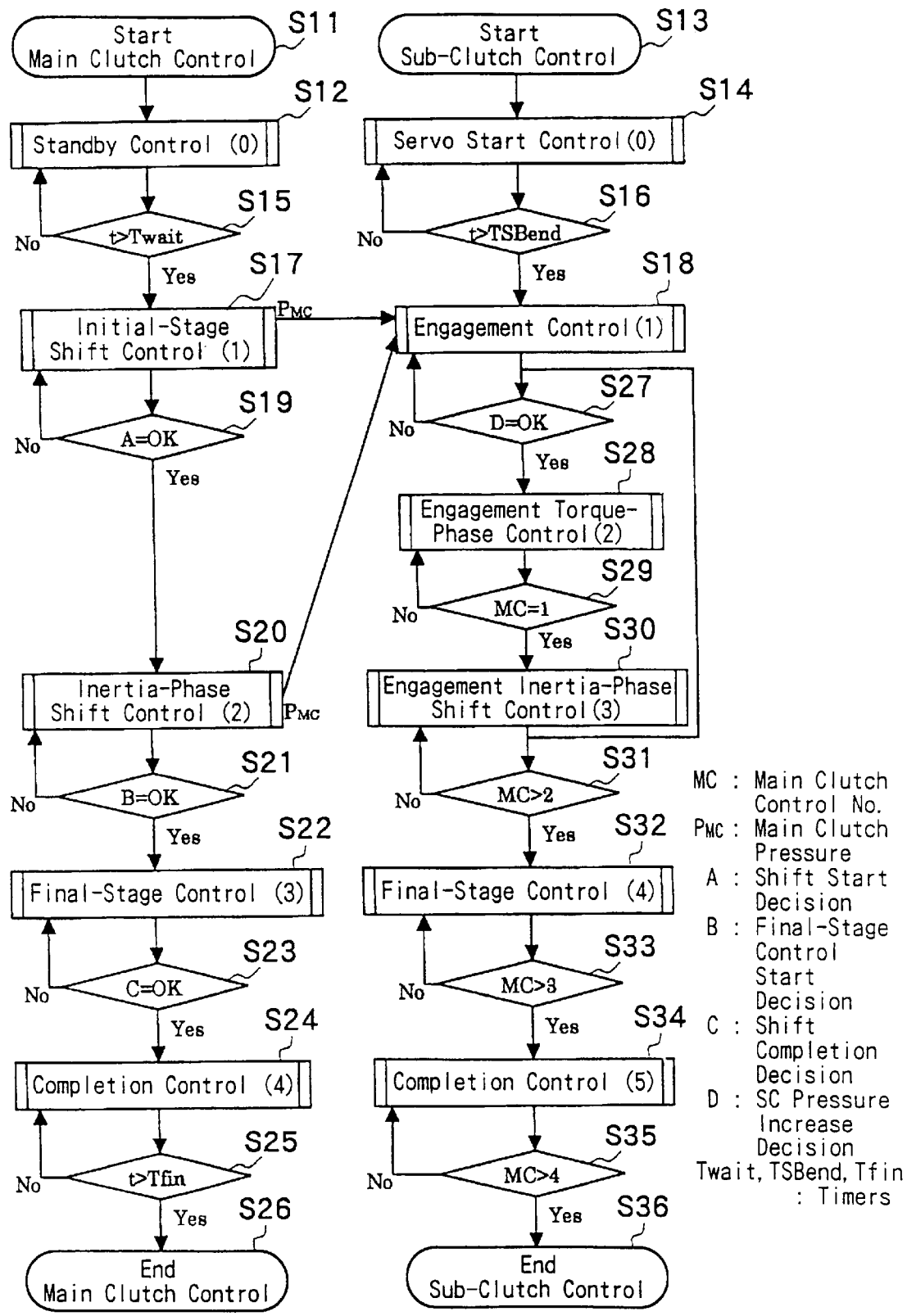
FIG. 5 is a flowchart illustrating the main clutch control subroutine and the sub-clutch control subroutine (steps S1 and S2 in FIG. 3)

Referring to FIG. 4, when the shift timing control starts (S6), the control unit 1 makes a shift start decision (A) and a sub-clutch SC pressure increase decision (D) (S7), indicated as decisions A and D (S19, S27) in the flowchart of FIG. 5. The control unit 1 then performs final-stage control start control (S8), relating to final-stage control start decision B (S21) in the flowchart of FIG. 5. The control unit 1 then performs shift completion control (S9), relating to shift completion decision C (S23). The shift timing control is thus completed.

The main clutch control and the sub-clutch control will now be described with reference to FIG. 5. When the main clutch control is started (S11), that is, when the 3-2 speed shift is decided, the control unit 1 performs standby control (0) (S12). In addition, when the sub-clutch control is started (S13) on the basis of the 3-2 speed shift decision, the control unit 1 performs servo start control (0) (S14). The standby control and the servo start control are continued for predetermined time lengths $T_{wait}$, $TSB_{end}$, respectively (S15, S16). By the servo start control (S14), the sub-clutch SC to be engaged is temporarily supplied with a sufficient fluid pressure to start piston stroke, and then a predetermined pressure (piston stroke pressure) is reached whereby the piston of the controlled servo is advanced to substantially eliminate the friction plate clearance. The time TSB is pre-set to be sufficiently long for this servo start. On the other hand, by the standby control (S12), the main clutch MC to be released stands by while maintaining the engagement for the third speed, until the servo start control is completed.

Figures 6A, 6B:
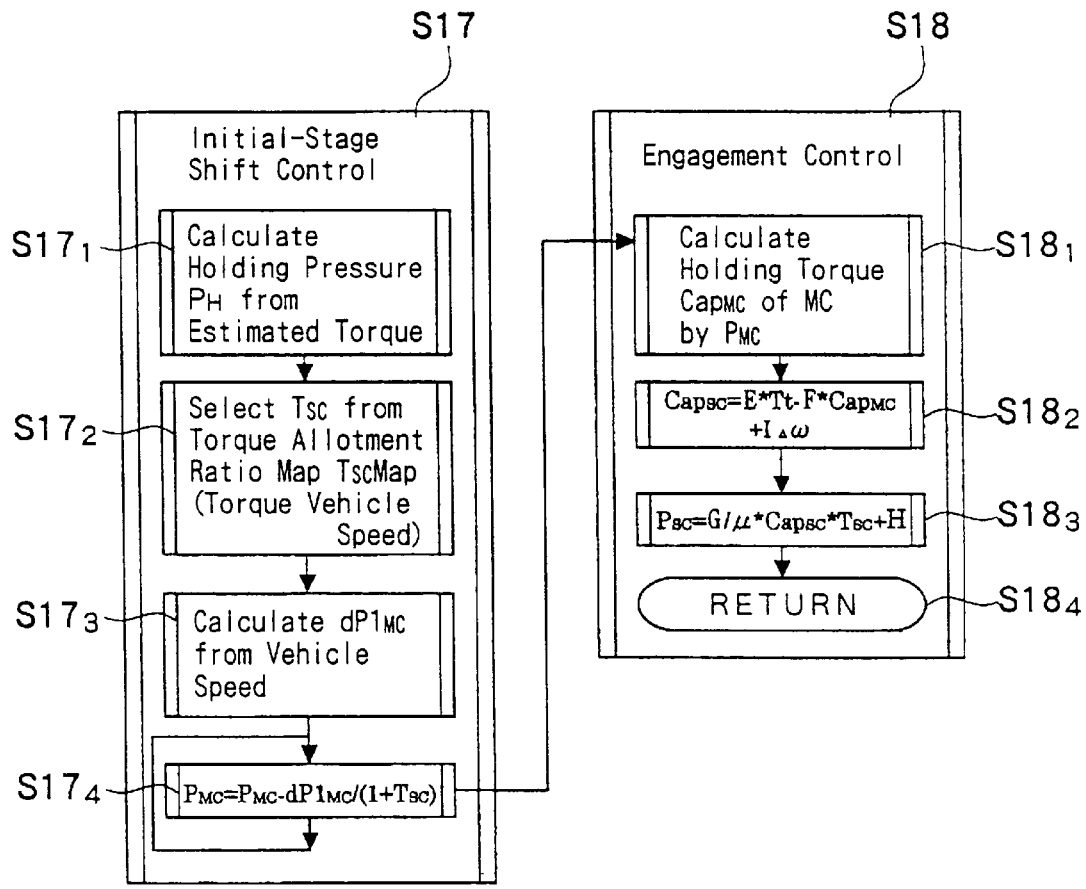
FIG. 6a is a flowchart illustrating the main clutch initial shift control subroutine (step S17 in FIG. 5)
FIG. 6b is a flowchart illustrating the sub-clutch engagement control subroutine (step S18 in FIG. 5)

Then, initial-stage shift control (1) of the main clutch MC is performed (S17), and engagement control (1) of the sub-clutch SC is performed (S18). In the initial-stage shift control (S17), as illustrated in FIG. 6a, the control unit 1 first calculates a holding pressure $P_H$ based on an estimated input torque, that is, a pressure occurring immediately before the input rotational speed calculated on the basis of the input (turbine) torque (S17$_1$). The aforementioned input torque is estimated by determining an engine torque from a map based on the throttle opening and the engine speed, calculating a speed ratio from the input and output rotational speeds of the torque converter, then determining a torque ratio from a map based on the speed ratio, and then multiplying the engine torque by the torque ratio.

Figures 9, 10:
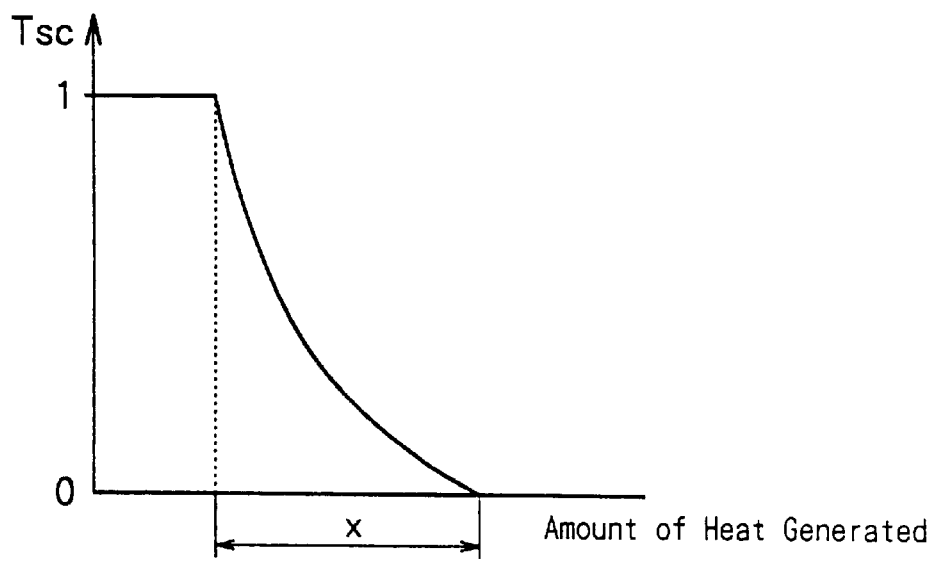
FIG. 9 shows a torque allotment ratio map.
FIG. 10 is a graph showing the relationship between the amount of heat generated and the torque allotment ratio.
Figure 11:
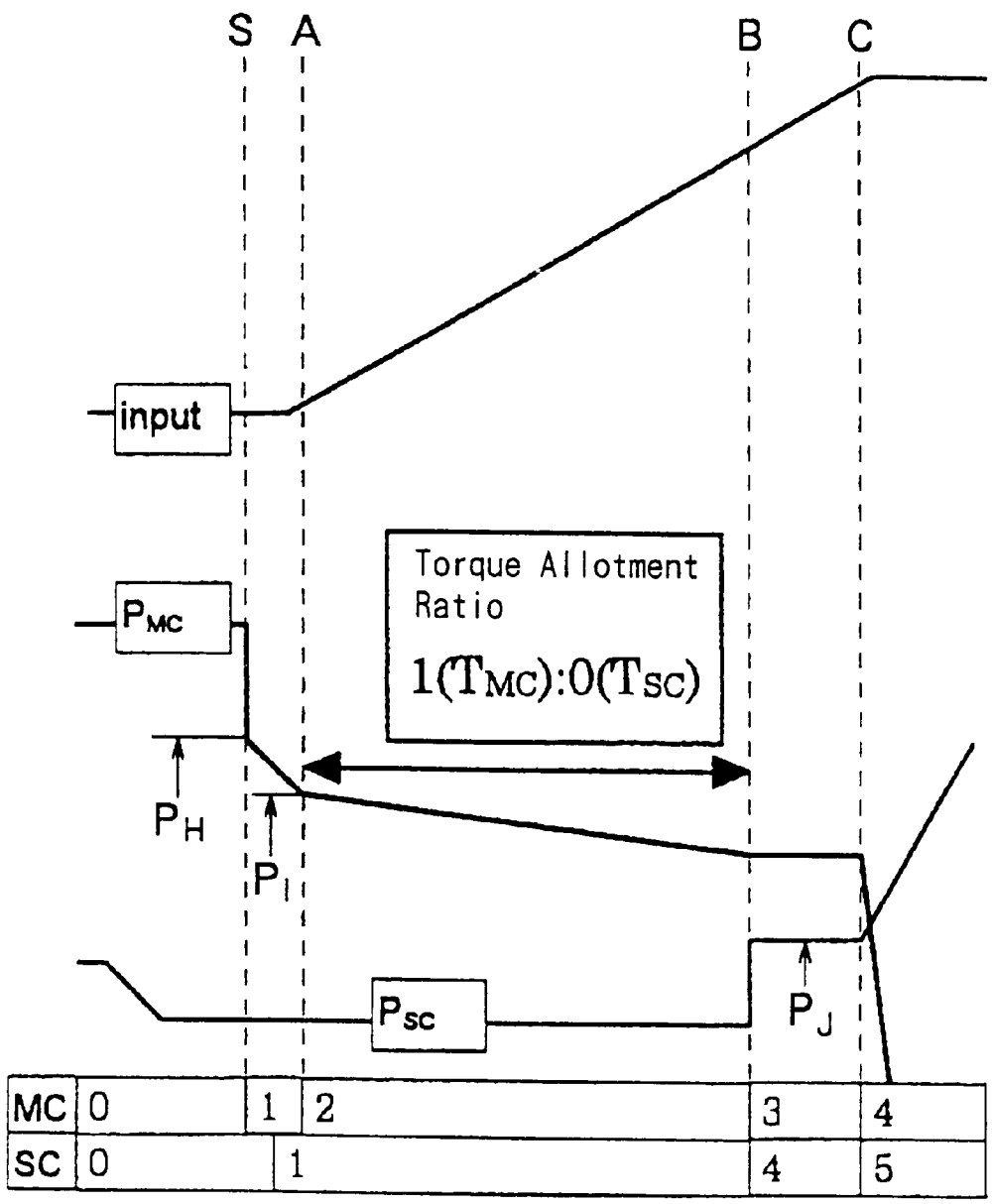
FIG. 11 is a graph showing the fluid pressure characteristics under power-on, high-vehicle-speed and high-torque conditions.
Figure 12:
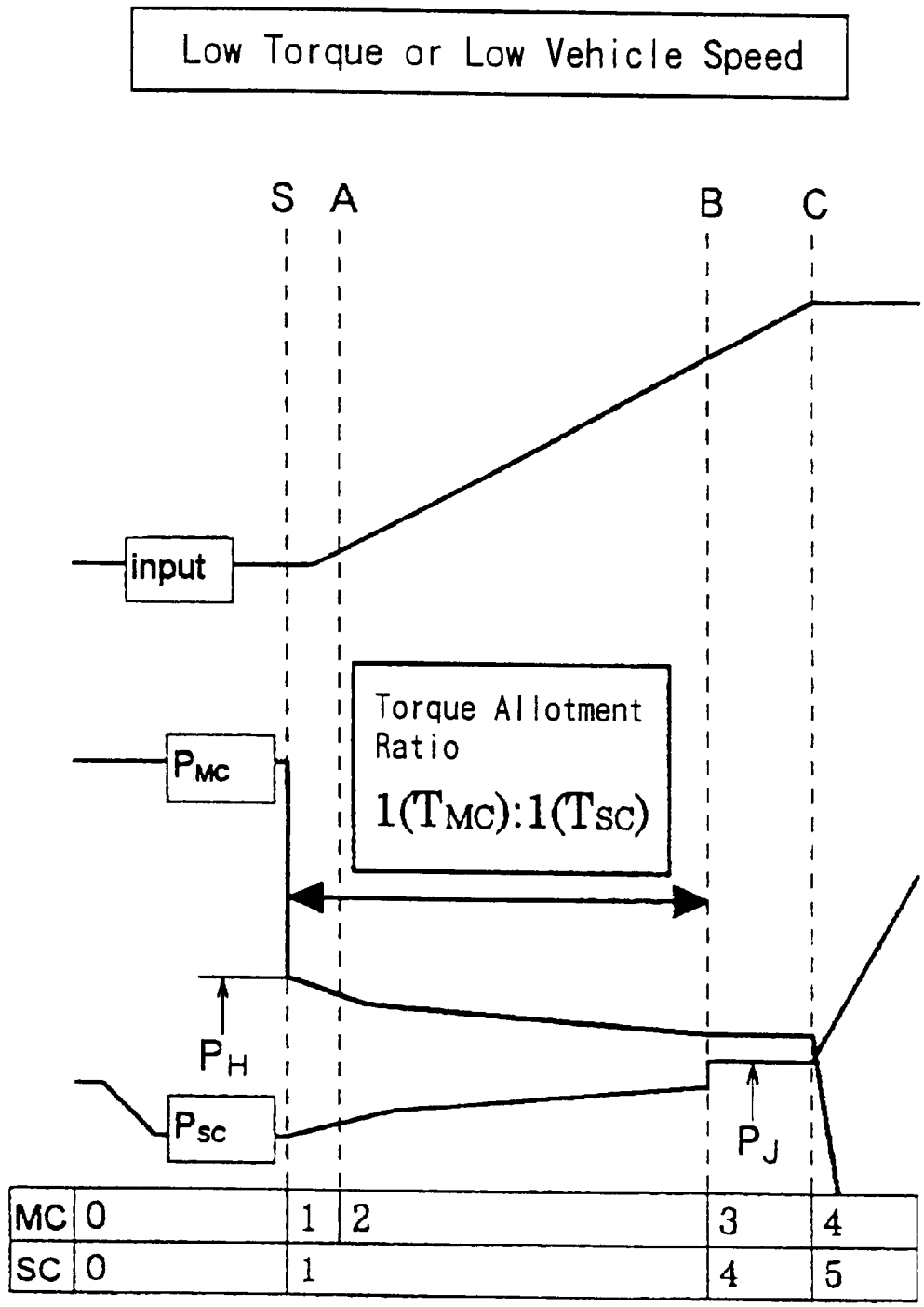
FIG. 12 is a graph showing the fluid pressure characteristics under power-on, low-torque or low-vehicle-speed conditions.

Subsequently, a torque allotment ratio for the sub-clutch SC is determined from a torque allotment ratio map. The torque allotment ratio map determines torque allotment ratios $T_{SC}$ for the sub-clutch in accordance with the vehicle speed and the throttle opening, as indicated in FIG. 9. For example, under high-vehicle-speed and high-torque conditions, the torque allotment ratio $T_{SC}$ becomes zero as indicated in FIG. 11. That is, the main clutch MC bears the entire input torque ($1(T_{MC})$: $0$ ($T_{SC}$) ). Under low-torque (small throttle opening) or low-vehicle-speed conditions, the torque allotment ratio $T_{SC}$ becomes "1", as indicated in FIG. 12, and the main clutch and the sub-clutch each respectively bear 50% of the input torque ($1(T_{MC})$:$1(T_{SC})$). In this shift control, since the allowance of heat generated by clutch slip is related solely to the sub-clutch SC to be engaged, the torque allotment ratio $T_{SC}$ is set such that the amount of heat generated by the sub-clutch SC and the shift feel are well balanced for the power-on condition range x, between a high vehicle speed and a low vehicle speed or between a high torque and a low torque.

Then, based on the vehicle speed (equivalent to the input rotational speed), the control unit 1 calculates a predetermined sweep gradient $dP1_{MC}$ from the holding pressure $P_H$ toward a target fluid pressure at the start of the inertia-phase where the input rotational speed changes (S17$_3$). Then, the control unit 1 sweeps down the main clutch fluid pressure $P_{MC}$ on the basis of a value calculated from the sweep gradient $dP1_{MC}$ and the sub-clutch torque allotment ratio $T_{SC}$ (S17$_4$, $P_{MC}=P_{MC}-dp1_{MC}/(1+T_{SC})$).

In the engagement control of the sub-clutch SC (S18), as illustrated in FIG. 6b, the control unit 1 calculates holding torque $Cap_{MC}$ of the main clutch MC based on the aforementioned fluid pressure $P_{MC}$ (S18$_1$). Based on this calculated holding torque, the control unit 1 calculates a holding torque $Cap_{SC}$ of the sub-clutch SC (S18$_2$). More specifically, the sub-clutch holding torque $Cap_{SC}$ is determined as ($Cap_{SC}=E \times T_t-F \times Cap_{MC}+I_{0\omega}$) where $T_t$ is the input (turbine) torque, $Cap_{MC}$ is the calculated main clutch holding torque, $I\Delta\omega$, is the vehicle inertia torque, and E and F are predetermined coefficients. Then, based on the sub-clutch holding torque, the torque allotment ratio $T_{SC}$ and the like, the control unit 1 calculates a fluid pressure supply $P_{SC}$ to the sub-clutch (S18$_3$). More specifically, the sub-clutch fluid pressure $P_{SC}$ is determined as ($P_{SC}=(G/\mu) \times Cap_{SC} \times T_{SC}+H$) where G is the area of the sub-clutch frictional engagement member, $\mu$ is the friction coefficient of the member, and H is the servo stroke pressure. Then, the routine returns to the engagement control of the sub-clutch SC that follows the operation of the main clutch MC (S18$_4$).

Then, upon detecting a change in the rotational speed of the input shaft by the sensor 5, the control unit 1 makes the shift start decision (A) (S19), and proceeds from the initial-stage shift control (1) to inertia-phase shift control (2) (S20). The inertia-phase shift control is performed by gradually reducing (sweeping down) the main clutch fluid pressure $P_{MC}$ from a fluid pressure $P_I$ at which the holding torque $Cap_{MC}$ of the main clutch MC becomes less than the input torque $T_T$ (see FIG. 11), under feedback control while monitoring changes in the input rotational speed. The inertia-phase shift control is continued until the accumulated input rotational speed change reaches a predetermined proportion, for example, 70%, of the total rotational speed change that occurs before the shift completion. When this predetermined proportion is reached or exceeded, the control unit 1 makes the final-stage control start decision (B) (S21), and proceeds to final-stage control (S22).

The inertia-phase shift control (S20) also controls the engaging fluid pressure $P_{SC}$ on the sub-clutch SC based on the releasing fluid pressure on the main clutch MC, as in the steps S18$_1$–S18$_4$.

The final-stage control (S22) maintains the main clutch fluid pressure $P_{MC}$ at a roughly fixed level or sweeps it down with a very small gradient. This control is continued until the total rotational speed change of the input shaft has been completed. When there is no more change occurring in the rotational speed of the input shaft, the control unit 1 makes the shift completion decision (C) (S23), and proceeds to completion control (4) (S24). The completion control completely drains the remaining fluid pressure by, for example, switching over the shift valves. When a predetermined time $T_{fin}$ elapses (S25), the control unit 1 ends the main clutch control (S26).

On the other hand, the engagement control (S18) of the sub-clutch continues until the sub-clutch pressure (SC pressure) increase control (D) is performed or until inertia-phase shift control (2) of the main clutch ends. If the SC pressure increase decision is made (for example, in the case of power-off), the control unit 1 performs engagement torque-phase control (1) such that the sub-clutch SC increases its torque capacity while slipping with friction, thus changing the torque allotment (S28). Synchronously with the end of the initial-stage control (1) of the main clutch MC (S29), the torque-phase control is replaced by engagement inertia-phase control (3) (S30). In the engagement inertia-phase control, the torque capacity of the sub-clutch SC increases over the drive torque of the vehicle.

Synchronously with the end of the inertia-phase shift control (2) in the main clutch control, that is, synchronously with the main clutch final-stage control start decision (B) (S31), the control unit 1 performs the final-stage control (4) of the sub-clutch (S32). Then, synchronously with the end of the final-stage control (3) of the main clutch, that is, synchronously with the shift completion decision (C) (S33), the control unit 1 performs the completion control (5) of the sub-clutch. When the completion control (4) of the main clutch ends (S35), the sub-clutch control also ends (S36).

Figure 7:
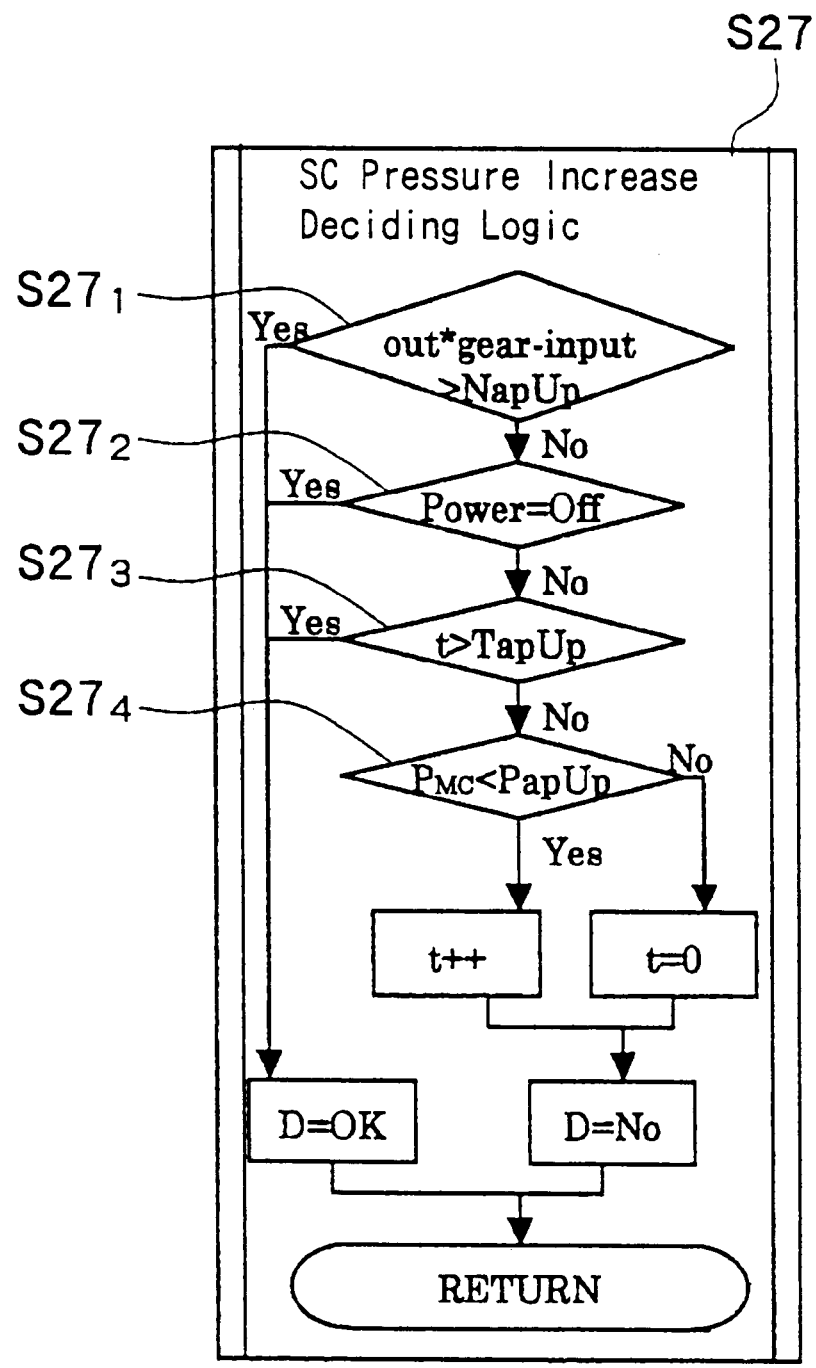
FIG. 7 is a flowchart illustrating the sub-clutch pressure increase decision logic (step S27 in FIG. 5)
Figure 8:
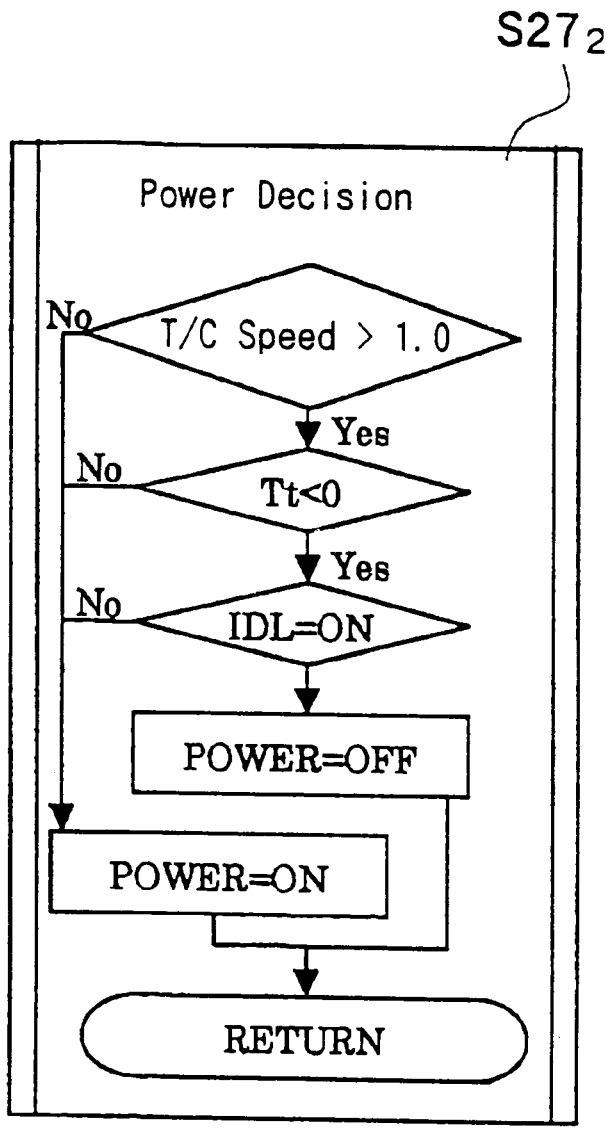
FIG. 8 is a flowchart illustrating the power-on-off determination subroutine (step S27 in FIG. 7)

The aforementioned SC pressure increase decision (S27) will now be explained with reference to FIG. 7. The sub-clutch control is performed depending on the hydraulic control of the main clutch MC in power-on conditions whereas, in power-off conditions and the like, it may become impossible to carry out a shift by the main clutch-major control because the small input torques in such conditions make the main clutch releasing fluid pressure ineffective. In such a case, the control unit 1 makes the SC pressure increase decision, that is, D=OK. More specifically, if the input rotational speed (out*gear–input) decreases by a predetermined amount (NapUp) or more (S27$_1$), that is, if the input rotational speed shifts toward the neutral, the decision D=OK is made. In addition, if it is under power-off conditions, the decision D=OK is also made (S27$_2$).

The decision D=OK is also made if the elapsed time (engaging-side waiting time TapUp), counted by a timer until a fluid pressure supply signal for the engaging sub-clutch SC is received, equals or exceeds a predetermined length of time (S27$_3$). The timer starts counting when the fluid pressure $P_{MC}$ on the releasing main clutch MC becomes less than a predetermined releasing pressure (PapUp), that is, the pressure on the piston of the servo operated main clutch MC, and the count is reset if it becomes higher than the predetermined releasing pressure (S27$_4$)

Power-off is determined (S27$_2$) if the torque converter (T/C) speed ratio is greater than 1.0 and the input (turbine) torque ($T_t$) is less than 0 and the accelerator pedal idle switch (IDL) is on.

The downshift control under various vehicle running conditions will next be described with reference to FIGS. 11 through 14. In FIGS. 11–14, the numerals 0, 1, 2, ..., shown in conjunction with the main clutch MC and the sub-clutch SC, indicate the corresponding control steps shown in FIG. 5.

FIG. 11 shows the fluid pressure characteristics for a downshift under high-vehicle-speed and high-torque conditions, as in a kick-down operation. In such a downshift, the sub-clutch torque $T_{SC}$ allotment ratio is 0 as shown in the torque allotment ratio map of FIG. 9, and the entire torque is allotted to and borne by the main clutch MC. After the main clutch fluid pressure $P_{MC}$ is controlled by the standby control (0) for the predetermined time $T_{wait}$ (S15), the initial-stage shift control (1) starts (S17) to reduce the fluid pressure to the predetermined holding pressure $P_H$ calculated from the estimated input torque, and then to sweep down the fluid pressure according to the predetermined gradient (see FIG. 6a). Then, when a change in the input shaft rotational speed is detected, the inertia-phase shift control (2) starts to down-sweep under feedback control. During these control steps, the sub-clutch is allotted no torque, and the entire torque is borne by the main clutch MC as mentioned above.

On the sub-clutch SC side, after the servo start control (0) continues for the predetermined time $TSB_{end}$ (S16), the engagement control (1) starts. The engagement control achieves a fluid pressure calculated from the main clutch fluid pressure (see FIG. 6b). Since the SC pressure increase decision logic illustrated in FIG. 7 does not conclude D=OK in this case, the engagement torque-phase control (2) and the engagement inertia-phase shift control (3) remain out of operation. Therefore, the sub-clutch fluid pressure $P_{SC}$ is maintained at a low level roughly equal to the piston stroke pressure since the torque allotment ratio $T_{SC}$ is 0.

When the final-stage control start decision B is made regarding the main clutch, the main clutch fluid pressure $P_{MC}$ is controlled by the final-stage control (3) so as to remain at a fixed level or is gradually swept down. In addition, synchronously with the final-stage control start decision B, the final-stage control (4) of the sub-clutch is also started (S31, S32). The final-stage control of the sub-clutch maintains the sub-clutch fluid pressure $P_{SC}$ at the predetermined holding pressure $P_J$ calculated from an input torque that has been corrected by a correction value from the input torque estimated by the main clutch initial-stage control (see S17$_1$). The sub-clutch SC is thus allowed to slip.

In the high-vehicle-speed and high-torque conditions, since the sub-clutch SC remains in the released state and generates no heat during a period corresponding to the main clutch inertia-phase shift control (2), the total heat generation during the shift control is limited to a small amount of heat that is generated by the slipping of the sub-clutch during a short period corresponding to the final-stage control (3) and (4).

Then, when the shift completion decision C is made, the completion control (4) of the main clutch starts so that the fluid pressure $P_{MC}$ is reduced with a steep gradient. The completion control (5) of the sub-clutch also starts so that the fluid pressure $P_{SC}$ increases with a steep gradient. Thus, the post-shift speed (2nd speed) is achieved where the main clutch MC is released and the sub-clutch SC is engaged.

FIG. 12 shows the fluid pressure characteristics for a downshift under low-torque or low-vehicle-speed conditions, as in traffic congestion. As in the above-described case, after the standby control (0), the initial-stage shift control (1) of the main clutch fluid pressure $P_{MC}$ starts to maintain the fluid pressure at a relatively low holding pressure $P_H$ calculated from the estimated input torque. In the low-torque or low-vehicle-speed running conditions, since the torque allotment ratio becomes 1 ($T_{MC}$):1 ($T_{SC}$), based on the torque allotment map, the down-sweep from the holding pressure $P_H$ is with a small gradient based a value involving the allotment ratio as a factor. Then, upon the shift start decision A (S19), the inertia-phase shift control (2) starts to perform feedback control involving the torque allotment ratio.

On the other hand, the sub-clutch fluid pressure PSC undergoes the servo start control (0) followed by the engagement control (1), which is started roughly simultaneously with the start of the initial-phase shift control of the main clutch. In the engagement control, since the torque allotment ratio $T_{SC}$=1 is used in the arithmetic expression (S18$_3$), the sub-clutch fluid pressure $P_{SC}$ sweeps up as the main clutch fluid pressure $P_{MC}$ sweeps down. The control unit 1 does not make the SC pressure increase decision D=OK under the low-torque or low-vehicle-speed conditions. Therefore, the engagement torque-phase control (2) and the engagement inertia-phase shift control (3) in the sub-clutch control will not be performed.

The terminology "servo-start," as used herein, has the same meaning as "fill phase" as used in the prior art. See, for example, the teaching at column 2, lines 29–35 of U.S. Pat. No. 4,707,789, the teachings of which are incorporated herein by reference.

Then, upon the final-stage control start decision B, the final-stage control (3) of the main clutch starts and, simultaneously, the final-stage control (4) of the sub-clutch starts so that the sub-clutch fluid pressure $P_{SC}$ is maintained at a predetermined holding fluid pressure $P_J$ corresponding to the input torque. Subsequently, upon the shift completion decision C, the completion control (4) of the main clutch fluid pressure $P_{MC}$ starts so that the pressure is rapidly removed and, simultaneously, the completion control (3) of the sub-clutch fluid pressure $P_{SC}$ starts so that the pressure is rapidly increased. Then the speed shift is completed.

Figure 13:
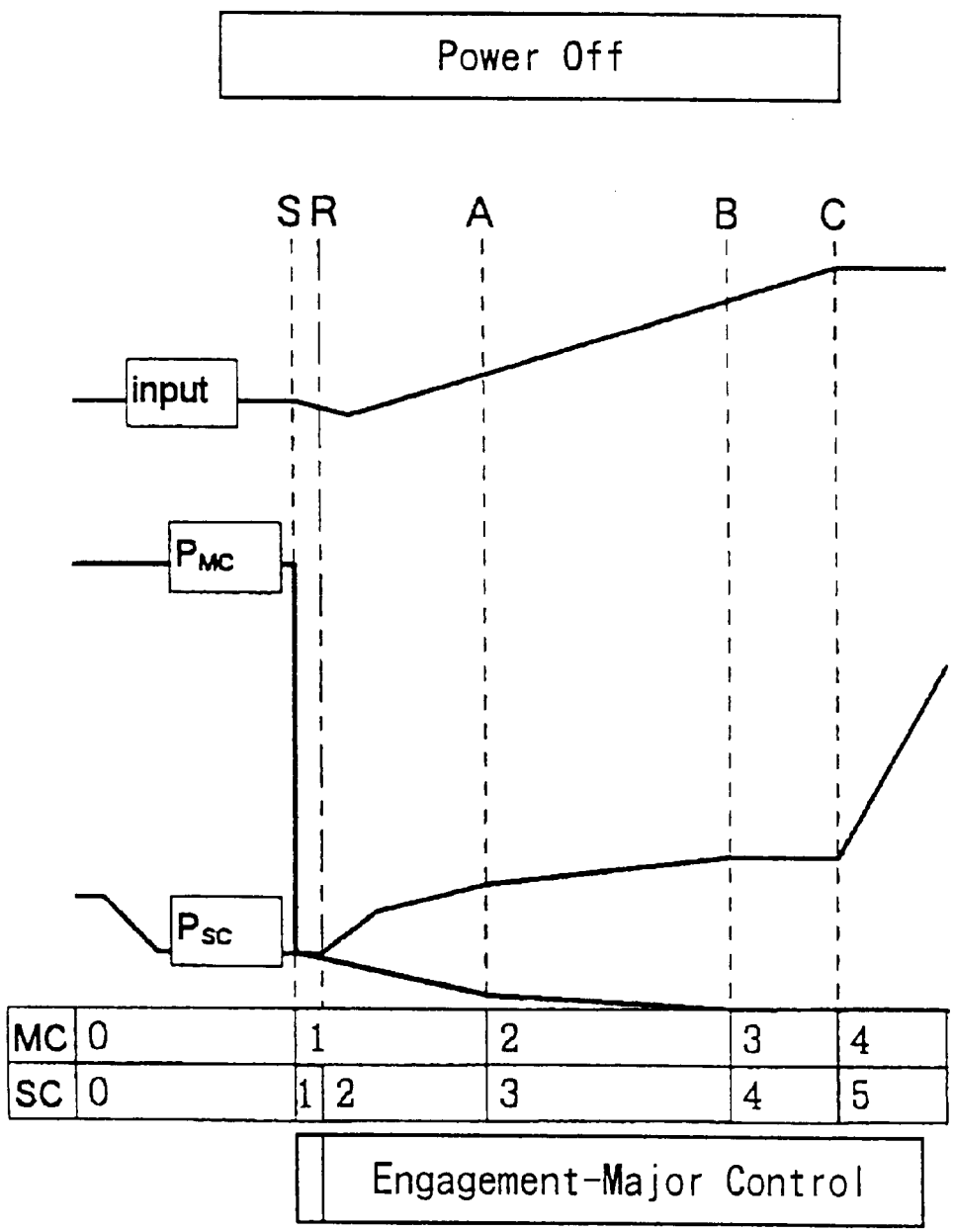
FIG. 13 is a graph showing the fluid pressure characteristics under power-off conditions.

FIG. 13 shows the fluid pressure characteristics for a downshift under power-off conditions, as in a manual downshift where the shift lever is shifted from the D range to the 2nd or L range for downhill travel. In such conditions, since the estimated input torque is small so that the holding pressure $P_H$ on the main clutch becomes ineffective, it is impossible to make the main clutch the direct object of major control. Thus, the sub-clutch to be engaged is subject to the major control, i.e. directly controlled.

Roughly simultaneously with the end of the standby control (0) of the main clutch and the start of the initial-phase shift control (1), the servo start control (0) of the sub-clutch ends and the engagement control (1) starts. Then, if the control unit 1 detects a change in the input shaft rotational speed toward the alto neutral side, that is, a predetermined amount (out*gear-input>NapUp) of decrease in the input rotational speed (S27$_1$), the control unit 1 makes the SC pressure increase decision D=OK (S27) (indicated by R in FIG. 13). Thus, going through step S27 only once, the sub-clutch control operation proceeds to the engagement torque-phase control (2).

Under power-off conditions, the shift control is performed with the engaging sub-clutch SC being the object of the major control. That is, the engaging-side holding pressure (target engaging fluid pressure) is calculated from the estimated input torque, and the sub-clutch fluid pressure $P_{SC}$ is swept up toward the holding pressure with a first gradient, and then with a second gradient based on the fluid pressure change calculated from the target rotational speed changing rate at the time of the start of change in the input rotational speed. Then, the control operation proceeds to the engagement inertia-phase shift control (3), by which the sub-clutch fluid pressure $P_{SC}$ is swept up with a further reduced gradient. The following final-stage control (4) maintains the sub-clutch fluid pressure $P_{SC}$ at a predetermined holding pressure. Then the completion control (5) rapidly increases the fluid pressure.

On the other hand, the main clutch fluid pressure $P_{MC}$ sweeps down through the initial-phase shift control (1), the inertia-phase shift control (2), the final-stage control (3) and the completion control (4) of the main clutch.

Figure 14:
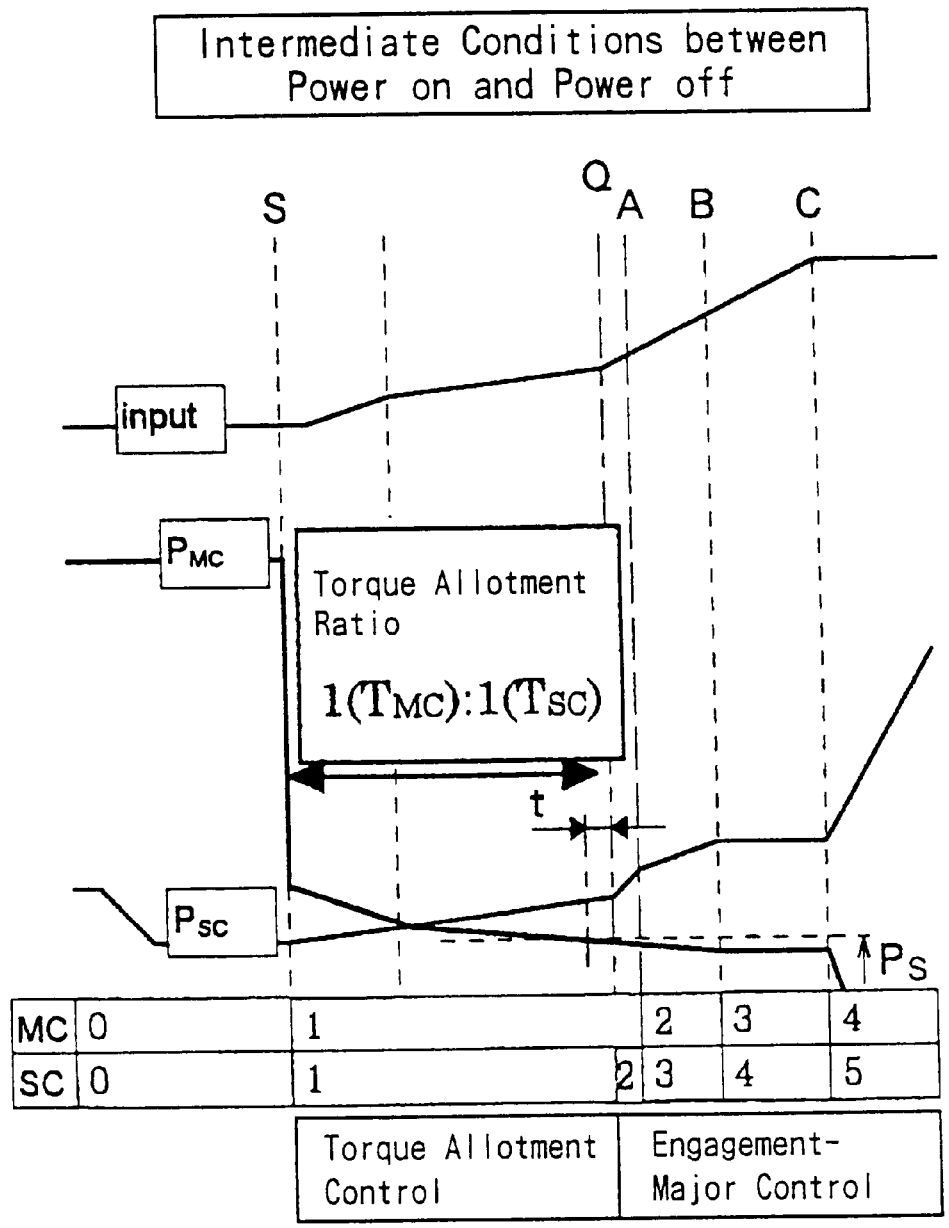
FIG. 14 is a graph showing the fluid pressure characteristics under intermediate conditions between the power-on and the power-off.

FIG. 14 shows the fluid pressure characteristics for a downshift under intermediate conditions between the power-on and the power-off conditions, as in the case where a manual downshift is performed during low-speed travel to produce a power-off state.

During the initial-stage shift control (1) of the main clutch fluid pressure $P_{MC}$ following the standby control (0), since the running is still with power-on, the holding pressure calculated from the estimated input torque is effective so that the input rotational speed changes. The torque allotment ratio is set to $1(T_{MC}):1(T_{SC})$ based on the map shown in FIG. 9, since the vehicle is running with low torque or low speed as in the case shown in the graph of FIG. 12. Therefore, the main clutch fluid pressure $P_{SC}$ sweeps down (S17$_4$) based on the arithmetic expression involving the aforementioned torque allotment ratio. On the other hand, the sub-clutch is controlled by the engagement control (1), where the sub-clutch fluid pressure $P_{SC}$ sweeps up depending on the main clutch fluid pressure $P_{MC}$, based on the arithmetic expression involving the torque allotment ratio (S18$_3$).

Then, when the main clutch fluid pressure $P_{MC}$ becomes less than a predetermined fluid pressure, for example, the piston stroke pressure $P_S$ (S27$_4$), the timer starts counting. After the timer counting has continued for a predetermined time t (S27$_3$), the control unit 1 makes the SC pressure increase decision D=OK (S27) (indicated by Q in FIG. 14).

On the other hand, the sub-clutch control operation proceeds to the engagement torque-phase control (2) immediately when the engagement control (1), based on the torque allotment ratio, makes the SC pressure increase decision D=OK in step S27. Thereby, the sub-clutch fluid pressure $P_{SC}$ is swept up along a predetermined gradient. The following inertia-phase shift control (3) sweeps up the fluid pressure with a reduced gradient. After the final-stage control (4) maintains $P_{SC}$ at a fixed holding pressure, the completion control (5) rapidly increases the sub-clutch fluid pressure $P_{SC}$. The sub-clutch SC becomes the major control object when the SC pressure increase decision D=OK is made, and such control is performed thereafter.

The main clutch fluid pressure $P_{MC}$ continues sweeping down through the inertia-phase shift control (2) and the final-stage control (3). The completion control (4) then releases the remaining pressure.

Although the embodiment has been described in conjunction with the 3-2 shift control, it should be apparent that the embodiment is applicable in substantially the same manner to the control of other downshifts involving engagement changeover.

While the present invention has been described with reference to what is presently considered to be the preferred embodiments thereof, it is to be understood that the invention is not limited to the disclosed embodiments. On the contrary, the invention is intended to cover various modifications and equivalent arrangements included within the spirit and scope of the appended claims.

What is claimed is:

1. A hydraulic control system for an automatic transmission mounted in a vehicle and comprising:
    an input shaft for receiving drive force from an engine output shaft;
    an output shaft connected to a wheel of the vehicle;
    a plurality of frictional engagement elements for establishing and changing a torque transfer path between the input shaft and the output shaft;
    hydraulic serves for engaging and disengaging the frictional engagement elements, said hydraulic control system downshifting to a predetermined speed by operation of a first hydraulic servo to release a first frictional engagement element of said plurality of frictional engagement elements and operation of a second hydraulic servo to engage a second frictional engagement element of said plurality of frictional engagement elements;
    hydraulic control means for controlling fluid pressures on said first and second hydraulic servos;
    a plurality of sensors for detecting various vehicle running conditions; and
    a control unit for receiving signals from said sensors, said control unit comprising:
        torque allotment ratio setting means for resetting a constant torque allotment ratio for allotment of input torque between torque to be borne by said first frictional engagement element and torque to be borne by said second frictional engagement element, responsive to signals from the sensors indicative of a change in at least one of the detected vehicle running conditions; and
        allotment fluid pressure control means for calculating changes in said fluid pressures for effecting the downshifting, in accordance with the torque allotment ratio and with the torque capacities of said first and second frictional engagement elements, so that said first frictional engagement element and said second frictional engagement element each bears its allotment of input torque, but not exceeding its torque capacity, and for outputting hydraulic control signals to said hydraulic control means to effect the calculated changes in said fluid pressure.

2. A hydraulic control system according to claim 1, wherein, responsive to power-on and a high vehicle speed or a high torque, the torque allotment ratio setting means sets a torque allotment ratio such that the input torque is borne solely by said first frictional engagement element.

3. A hydraulic control system according to claim 1, wherein, responsive to power-on, and a low vehicle speed or low torque, the torque allotment ratio setting means sets a torque allotment ratio such that said first frictional engagement element and said second frictional engagement element are provided with respectively predetermined torques.

4. A hydraulic control system according to claim 1, wherein, responsive to power-on and a vehicle speed within a predetermined range or a torque within a predetermined range, the torque allotment ratio setting means sets a torque allotment ratio to maximize smoothness of the shift and to minimize the amount of heat generated by said second frictional engagement element.

5. A hydraulic control system according to claim 1, wherein the allotment fluid pressure control means is means for calculating a releasing-side fluid pressure based on the torque capacity of said first frictional engagement element, and for calculating an engaging-side fluid pressure for said second frictional engagement element depending on the releasing-side fluid pressure.

6. A hydraulic control system according to claim 5, wherein said control unit further comprises:
deciding means for deciding to proceed to a control operation directly controlling the engaging-side fluid pressure on said second frictional engagement element, independent of the releasing-side fluid pressure on said first frictional engagement element.

7. A hydraulic control system according to claim 6, wherein the deciding means makes the decision responsive to detection of a predetermined decrease in the input shaft rotational speed prior to a shift.

8. A hydraulic control system according to claim 7, wherein the deciding means makes the decision responsive to detection of a releasing-side fluid pressure below a predetermined fluid pressure.

9. A hydraulic control system according to claim 1, wherein the allotment fluid pressure control means is means for calculating a releasing-side fluid pressure based on the torque capacity of said first frictional engagement element, and for calculating an engaging-side fluid pressure for said second frictional engagement element depending on the releasing-side fluid pressure.

10. A hydraulic control system according to claim 9, wherein said control unit further comprises:
deciding means for deciding to proceed to a control operation directly controlling the engaging-side fluid pressure on said second frictional engagement element, independent of the releasing-side fluid pressure on said first frictional engagement element.

11. A hydraulic control system according to claim 10, wherein the deciding means makes the decision responsive to detection of a predetermined decrease in the input shaft rotational speed prior to a shift.

12. A hydraulic control system according to claim 11, wherein the deciding means makes the decision responsive to detection of a releasing-side fluid pressure below a predetermined fluid pressure.

13. A hydraulic control system according to claim 3, wherein the allotment fluid pressure control means is means for calculating a releasing-side fluid pressure based on the torque capacity of said first frictional engagement element, and for calculating an engaging-side fluid pressure for said second frictional engagement element depending on the releasing-side fluid pressure.

14. A hydraulic control system according to claim 13, wherein said control unit further comprises:
deciding means for deciding to proceed to a control operation directly controlling the engaging-side fluid pressure on said second frictional engagement element, independent of the releasing-side fluid pressure on said first frictional engagement element.

15. A hydraulic control system according to claim 14, wherein the deciding means makes the decision responsive to detection of a predetermined decrease in the input shaft rotational speed prior to a shift.

16. A hydraulic control system according to claim 15, wherein the deciding means makes the decision responsive to detection of a releasing-side fluid pressure below a predetermined fluid pressure.

17. A hydraulic control system according to claim 4, wherein the allotment fluid pressure control means is means for calculating a releasing-side fluid pressure based on the torque capacity of said first frictional engagement element, and for calculating an engaging-side fluid pressure for said second frictional engagement element depending on the releasing-side fluid pressure.

18. A hydraulic control system according to claim 17, wherein said control unit further comprises:
deciding means for deciding to proceed to a control operation directly controlling the engaging-side fluid pressure on said second frictional engagement element, independent of the releasing-side fluid pressure on said first frictional engagement element.

19. A hydraulic control system according to claim 18, wherein the deciding means makes the decision responsive to detection of a predetermined decrease in the input shaft rotational speed prior to a shift.

20. A hydraulic control system according to claim 19, wherein the deciding means makes the decision responsive to detection of a releasing-side fluid pressure below a predetermined fluid pressure.

21. A hydraulic control system for an automatic transmission mounted in a vehicle and comprising:
an input shaft for receiving drive force from an engine output shaft;
an output shaft connected to a wheel of the vehicle;
a plurality of frictional engagement elements for establishing and changing a torque transfer path between the input shaft and the output shaft;
hydraulic servos for engaging and disengaging the frictional engagement elements, said hydraulic control system downshifting to a predetermined speed by operation of a first hydraulic servo to release a first frictional engagement element of said plurality of frictional engagement elements and operation of a second hydraulic servo to engage a second frictional engagement element of said plurality of frictional engagement elements;
hydraulic control means for controlling fluid pressures on said first and second hydraulic servos;
a plurality of sensors for detecting various vehicle running conditions; and
a control unit for receiving signals from said sensors and for outputting a hydraulic control signal to said hydraulic control means, said control unit comprising:
torque allotment ratio setting means for selecting, responsive to the hydraulic control signal, one of the following control routines for said downshifting:
(1) a power-on, high vehicle speed or high torque routine wherein said second frictional engagement element transmits no torque until start of a final-stage control whereat pressure to said second hydraulic servo is increased by a predetermined increment and wherein said first frictional engagement element bears all torque transmitted through the torque transfer path up to start of the final-stage control of the second frictional engagement element;
(2) a power-on, low vehicle speed or low torque routine wherein the torque transmitted through the torque transfer path is shared by said first and second frictional engagement elements during said downshifting;

(3) a power-off routine wherein pressure to said first hydraulic servo is swept down to zero prior to final phase control of said second frictional engagement element while pressure to said second hydraulic servo is swept up; and (4) a power-on to power-off transition routine wherein the transmitted torque is shared by said first and second frictional engagement elements and wherein pressure to said second hydraulic servo is increased in dependence upon release of pressure from said first hydraulic servo during a torque allotment control.

22. A hydraulic control system according to claim 21 wherein, in the power-on, low vehicle speed or low torque routine, pressure to said second hydraulic servo is increased in dependence upon release of pressure from said first hydraulic servo.

23. A hydraulic control system according to claim 21, wherein said torque allotment ratio setting means selects said power-off routine responsive to detection of a reduction in rotational speed of said output shaft.

\* \* \* \* \*

UNITED STATES PATENT AND TRADEMARK OFFICE
CERTIFICATE OF CORRECTION

PATENT NO. : 5,908,370
DATED : June 1, 1999
INVENTOR(S) : KUBO et al

It is certified that error appears in the above-identified patent and that said Letters Patent is hereby corrected as shown below:

Col. 4, line 67, "S27" should read --$S27_2$--.

Col. 7, line 24, "dp1" should read --dP1--; and
line 34, "$I\Delta\omega$," should read --$I\Delta\omega$--.

Col. 10, line 53, delete "alto".

Col. 12, line 10, "serves" should read --servos--.

Signed and Sealed this

Seventh Day of November, 2000

Attest:

Q. TODD DICKINSON

*Attesting Officer*     *Director of Patents and Trademarks*